US012621911B2

(12) United States Patent
Luo

(10) Patent No.: US 12,621,911 B2
(45) Date of Patent: May 5, 2026

(54) CONTROL SYSTEM AND CONTROL METHOD FOR LED STRING LIGHT SOURCE

(71) Applicant: Cheng Luo, Shenzhen (CN)

(72) Inventor: Cheng Luo, Shenzhen (CN)

( * ) Notice: Subject to any disclaimer, the term of this patent is extended or adjusted under 35 U.S.C. 154(b) by 112 days.

(21) Appl. No.: 18/741,786

(22) Filed: Jun. 13, 2024

(65) Prior Publication Data

US 2025/0254769 A1 Aug. 7, 2025

(30) Foreign Application Priority Data

Feb. 5, 2024 (CN) ........................ 202410165728.3

(51) Int. Cl.
*H05B 45/24* (2020.01)
*H05B 47/185* (2020.01)

(52) U.S. Cl.
CPC ........... *H05B 45/24* (2020.01); *H05B 47/185* (2020.01)

(58) Field of Classification Search
CPC ....... H05B 45/24; H05B 47/185; H05B 45/20
See application file for complete search history.

(56) References Cited

U.S. PATENT DOCUMENTS

2008/0122588 A1* 5/2008 Chang .................. H05B 47/184
340/332
2009/0146931 A1* 6/2009 Kharrati ................ G06F 3/1446
345/82
2013/0147370 A1* 6/2013 Williams ............... H05B 47/28
315/185 R
2020/0137859 A1* 4/2020 Yan ......................... H04L 61/50

OTHER PUBLICATIONS

SM18512PS DMX IC Datasheet, 2023. Available at: [https://www.gree-leds.com/web/userfiles/download/SM18512PSICdatasheetEn.pdf] (Year: 2023).*

* cited by examiner

*Primary Examiner* — Daniel F Hajnik
*Assistant Examiner* — Adeel Bashir
(74) *Attorney, Agent, or Firm* — Che-Yang Chen

(57) ABSTRACT

A control system and control method for LED string light source with fast control speeds, occupy low signal transmission capacity, and can smartly detect faults in the LED string light source, wherein comprising an LED string light provided with a plurality of LED point light sources, a power line and data control line connected between the decoder controller and each LED point light source. Address lines are used in the LED string light source to connect all address pins of the smart driver chip in series based on the numerical order of the electrical connection of the decoder controller. The smart driver chip requires rewriting the temporary address once every power-on cycle. Since the chip has a signal feedback function, users do not need specialized personnel to effectively use the decoder controller to assess the status of the point light source.

8 Claims, 1 Drawing Sheet

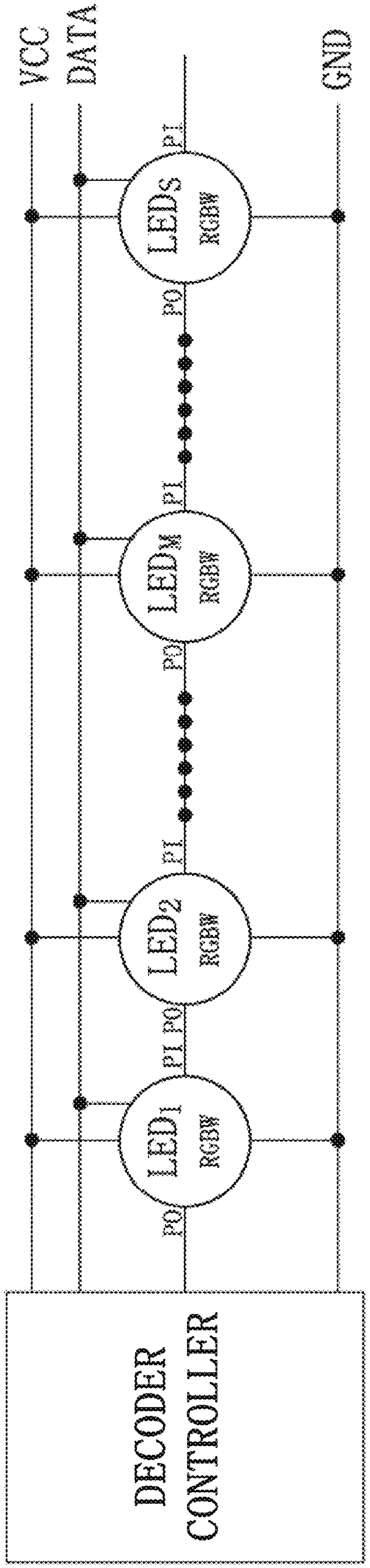
VCC
DATA
GND
PI
LEDS
RGBW
PO
PI
LEDM
RGBW
PO
PI
LED2
RGBW
PO
PI
LED1
RGBW
PO
DECODER
CONTROLLER

CONTROL SYSTEM AND CONTROL METHOD FOR LED STRING LIGHT SOURCE

BACKGROUND OF THE PRESENT INVENTION

Field of Invention

The present invention relates to an LED string light source, and more particularly to a control system and control method for LED string light source.

Description of Related Arts

At present, various types of LED string light sources are used in building advertising curtain walls, festive celebrations, and entertainment venues. These types of LED string light sources comprise a plurality of electrically connected LED point light sources. Each LED string light source comprises either tri-color LED lamp beads or quad-color LED lamp beads, wherein the tri-color type has red (R color), green (G color), and blue (B color) LED lamp beads, while the quad-color type has red (R color), green (G color), blue (B color), and white (W color) lamp beads. Each LED point light source comprises a smart driver chip used in the detection of status of each LED lamp bead and control of the operation of each LED lamp bead.

Each smart driver chip is provided with a unique code that represents the identity thereof, wherein the code is known as a fixed address code, which is completed during a chip manufacturing process through a programming technique.

Although each smart driver chip has a code, the number of LED point light sources required to make up the LED string light source is very large. As such, during the manual assembly process of the LED string light source, the electrical connections between the smart driver chips of each LED point light source are not made according to the natural numerical order of the codes. Consequently, after completing the assembly of the LED string light source, there is a certain degree of difficulty for the decoder controller to transmit normal working signals to the LED string light source (The normal working signals, also known as color codes, are PWM signals transmitted by the decoder controller to each LED point light source, wherein the PWM signals correspond to the display brightness value required for each color lamp bead. The purpose of the PWM signals is to ensure that the LED string light source correctly displays the intended multimedia information, such as advertisements, text patterns, and video content).

In most of the conventional LED string light sources, the smart driver chip in each LED point light source has an EEPROM (Electrically-Erasable Programmable Read-Only Memory), such as a UCS512B3 smart driver chip. Due to the lack of a signal feedback function, therefore, during the assembly of the LED light sources, the smart driver chip in each LED point light source must be strictly assembled according to the natural numerical order of the fixed address codes. This ensures that there is no issue with incorrect lighting colors when the decoder controller is transmitting the normal working signals to the LED string light source. However, when there is an issue with one or more LED point light sources of the LED string light source, this issue can only be detected through a visual inspection by a person, hence it is not possible to achieve a smart warning function.

In recent years, some LED string light sources have smart driver chips in each LED point light source that include the function to send feedback signals to the decoder controller. However, these smart driver chips merely upload the fixed address codes to the decoder controller, and when the decoder controller is transmitting normal lighting signals to the LED string light source, the signals transmitted must include the fixed address code plus the color code of each smart driver chip. Due to the transmission of a large amount of information, this leads to insufficient system capacity and slow transmission speeds. In addition, similar to the previously mentioned smart driver chips, when there is an issue with one or more LED point light sources of the LED string light source, it is not possible to achieve a smart warning function.

SUMMARY OF THE PRESENT INVENTION

The present invention aims to solve a technical problem by providing a control system and a control method for LED string light source with fast control speeds, occupy low signal transmission capacity, and can smartly detect faults in the LED string light source.

In order to solve the aforementioned technical problem, the technical solution adopted by the present invention is as follows:

The present invention provides a control system for LED string light source, comprising an LED string light provided with a plurality of LED point light sources, a power line and a data control line connected between the decoder controller and each LED point light source, wherein each set of LED point light sources comprises either red, green, and blue LED lamp beads with a smart driver chip, or red, green, blue, and white LED lamp beads with a smart driver chip, all LED lamp beads are connected between the power supply terminal and the ground terminal of the power line through the corresponding smart driver chip, the data reception terminal of each set of smart driver chips is connected to the data control line via connecting wires, wherein the use of address lines in the LED string light source to connect all address pins of the smart driver chip in series based on the natural numerical order of the electrical connection of the decoder controller, wherein for the smart driver chips in each adjacent pair of LED point light sources, the address signal input terminal of the smart driver chips in the preceding set is connected to the address signal output terminal of the smart driver chips in the succeeding set, and the address signal output terminal of the smart driver chips in the first set of LED point light sources of the LED string light source is connected to the signal reception terminal of the decoder controller.

The decoder controller is also provided with an addressing module, an assignment module, and a string light signal transmission module, wherein, The addressing module is used for determining the electrical connection distance between the spatial positions of the smart driver chips in each set of LED point light sources in the LED string light source and the decoder controller;

The assignment module is used for assigning a temporary address code to the smart driver chips in each set of LED point light sources, wherein the temporary address code is assigned sequentially based on the electrical connection distance between the smart driver chips in the set to the decoder controller;

The string light signal transmission module is used for transmitting the multimedia information signals to the LED string light source for display, including advertisements, text patterns, and video content.

The information which is sent by the addressing module from the data control line to the LED string light source comprises a clear reset signal for resetting the temporary addresses of the smart driver chips in each set to zero when an electrical power is connected to the LED string light source, an address status collection signal for instructing each smart driver chip to send the chip address and the status information of the smart driver chip back to the decoder controller, and a feedback address signal that is received from each smart driver chip via address lines for indicating the chip address and the status information that have transmitted back to the decoder controller in sequence based on the electrical connection distance from the smart driver chip to the decoder controller;

The assignment module, after the addressing module has finished collecting the chip addresses and the status information of the smart driver chips in all LED point light sources, the module assigns temporary address codes according to numerical order to each smart driver chip based on the electrical connection distance between the smart driver chip and the decoder controller, and after that, sends both the fixed address codes and the assigned temporary address codes of each smart driver chip via the data control line to each smart driver chip.

The chip address and status information stored in the shift register of the smart control chips, comprising N1 bits of fixed address information, N2 bits of temporary address information, 2 bits of R color anomaly feedback information, 2 bits of G color anomaly feedback information, and 2 bits of B color anomaly feedback information; or comprising N1 bits of fixed address information, N2 bits of temporary address information, 2 bits of R color anomaly feedback information, 2 bits of G color anomaly feedback information, 2 bits of B color anomaly feedback information, and 2 bits of W color anomaly feedback information;

The clear reset signal is a low-level signal of 80 μs;

The address status collection signal is a square wave signal made of a high-level signal ranging 80 μs-1 μs and a low-level signal ranging 80 μs-1 μs. A set of the address status collection signal comprises (N1+N2+2×3) of the square wave signal or a set of the address status collection signal comprising (N1+N2+2×4) of the square wave signal.

The feedback address signal, after each smart driver chip has received one of the address status collection signals, shifts the chip address and the status information stored in the shift register from a low-order digit to a high-order digit by one bit, wherein the highest digit of the chip address and the status information is shifted to the lowest digit position of the shift register of the electrically connected preceding smart driver chip. After each smart driver chip has received one set of the address status collection signals, all the chip address and the status information originally stored in the shift register are transferred to the shift register of the electrically connected preceding smart driver chip; after the first smart driver chip that is electrically connected to the decoder controller has received the first set of the address collection signal, the chip address and the status information will be uploaded to the decoder controller.

The control method of the LED string light source of the present invention, using the control system of the LED string light source of the present invention, wherein the control method is as follows:

1) When the fully installed LED string light source is powered on, the decoder controller sends a clear reset signal to the LED string light source via the data control line, thus resetting the temporary address codes of the smart driver chip in each LED point light source to zero;

2) Then, the decoder controller sends a plurality of address collection signals to the smart driver chip in each LED point light source via the data control line, thus instructing each smart driver chip to start sending feedback address signals to the decoder controller; the chip address and the status information stored in the shift registers are transmitted back to the decoder controller;

3) The transmission method of the feedback address signals is as follows:

a. After each smart driver chip has received one address collection signal, uploads the highest digit of the chip address and the status information stored in the shift register to the position of the lowest digit of the shift register of the electrically connected preceding smart driver chip via the address lines. The other digits of the chip address and the status information are shifted by one bit higher in the bit count from the lower positions to the higher positions;

b. After each smart driver chip has finished receiving one set of the address collection signals, uploads the chip address and the status information stored in the shift register to the shift register of the electrically connected preceding smart driver chip, wherein the number of signals in one set of the address collection signals is equal to the number of bits in the chip address and the status information.

c. After the decoder controller sends out the M-th set of the address collection signals, the chip address and the status information stored in the shift register of the smart driver chip of the M-th LED point light source in the LED string light source will be sequentially uploaded to the decoder controller via the shift register of the smart driver chip of the (M−1)-th, (M−2)-th, . . . , 1st LED point light source;

4) After the decoder controller has finished collecting the chip addresses and the status information of the smart driver chips in all LED point light sources, assign temporary address code to each smart driver chip in numerical order according to the electrical connection distance between the smart driver chips to the decoder controller;

5) Then, the decoder controller sends both the fixed address code and the assigned temporary address code to the corresponding smart driver chip via the data control line.

In the aforementioned method, the address and the status information are data of 48-bit, wherein comprising 29 bits of fixed address information, 11 bits of temporary address information, 2 bits of R color anomaly feedback information, 2 bits of G color anomaly feedback information, and 2 bits of B color anomaly feedback information; or comprising 48 bits of fixed address information, 11 bits of temporary address information, 2 bits of R color anomaly feedback information, 2 bits of G color anomaly feedback information, 2 bits of B color anomaly feedback information, and 2 bits of W color anomaly feedback information, wherein, For the highest digit in each color anomaly feedback information, "0" indicates that there is no leakage of electricity in the color lamp bead, while "1" indicates that there is a leakage of electricity in the color lamp bead;

For the lowest digit in each color anomaly feedback information, “0” indicates that the color lamp bead can light up normally, while “1” indicates an abnormal operation in the color lamp bead.

In the aforementioned method, after the decoder controller has finished sending the first set of address collection signals, if the smart driver chip of the S-th LED point light source located at the end of the electrical series connection of the LED string light source continues to receive address collection signals, the smart driver chip will upload a binary code of “1” to the smart driver chip of the (S−1)-th LED point light source via the address lines, until a stop collection reset signal for halting the address collection sent by the decoder controller via the data control line has been received.

In the aforementioned method, the stop collection reset signal is a low-level signal of 80 μs.

In the aforementioned method, after the decoder controller has sent the stop collection reset signal, sends a special verification code to the LED string light source via the data control line to instruct each smart driver chip to enter a status to readily receive the assigned temporary address codes, wherein the special verification code comprises an instruction code, a checksum code, a current regulation code, an RGBW channel selection code, a circuit detection Boolean code, and a gamma modulation Boolean code, wherein, The instruction code has 16 bits;

The checksum code also has 16 bits and is complementary to the instruction code;

The current regulation code has 5 bits and is used to regulate the current level for each LED point light source;

The RGBW channel selection code has 1 bit, wherein the digit “0” indicates the selection of the RGB channel, while the digit “0” indicates the selection of the RGBW channel;

The circuit detection Boolean code has 1 bit, wherein the digit “1” indicates the need for a current regulation, while the digit “0” indicates that the current do not need to be regulated;

The gamma modulation Boolean code has 1 bit, wherein the digit “1” indicates that the gamma modulation is in use, while the digit “0” indicates that the gamma regulation is not in use.

In the aforementioned method, the decoder controller sends both the fixed address code and the assigned temporary address code of each smart driver chip to the corresponding smart driver chip as follows:

After each smart driver chip has received the special verification code, the decoder controller sends S sets of temporary write address code signals to the LED string light source, wherein each set of temporary write address code signals corresponds to one smart driver chip of the LED point light source. Each set of temporary write address code signals contains 40 bits of information, comprising 29 bits of fixed address code information of the corresponding smart driver chip plus 11 bits of temporary address code information assigned by the decoder controller to the smart driver chip.

As compared with the currently existing technology, the smart driver chip of the present invention requires writing the temporary address once every power-on cycle. Since the chip does not have a memory function, the chip needs to be rewritten each time. The chip is able to provide feedback on the fixed address, the temporary address information, and the RGB status information to the decoder controller, thus allowing customers to clearly and accurately understand the status of each LED lamp bead of the LED point light source. Since the chip has a signal feedback function, users do not need specialized personnel to effectively use the decoder controller to assess the status of the point light source, and as such, the chip eliminates the need for an EEPROM module, causing the chip to be cheaper than the UCS512B3 chip.

BRIEF DESCRIPTION OF THE DRAWINGS

FIG. 1 is a schematic diagram illustrating the connection of the control system of the LED string light source of the present invention.

DETAILED DESCRIPTION OF THE PREFERRED EMBODIMENT

As shown in FIG. 1, the control system of the present invention comprises a decoder controller and an LED string light source provided with a plurality of LED point light sources, wherein each LED point light source further comprises a plurality of LED lamp beads of primary colors and a smart driver chip.

In the FIGURE, “LED” represents the smart driver chip of the LED point light source, wherein the pins comprise: VCC/GND/R/G/B/W/PI/PO/DATA, wherein VCC is the voltage supply terminal, GND is the ground terminal, R, G, B, and W respectively represent the power supply terminals for the red, green, blue, and white LED lamp beads in the LED light source, PI and PO are address lines connected in series between the smart driver chips, and DATA is the data control line parallel to all smart driver chips.

1. Decoder Controller

Sends various control signals to the smart driver chips of the LED point light sources in the LED string light source via the data control line, and simultaneously, receives various signals fed back from the smart driver chips via the address lines.

2. Smart Driver Chip

Each smart driver chip has one unique fixed address code that represents the identity thereof, wherein the fixed address code is encoded in binary and further includes a shift register and a calculation module.

To reduce costs, laser trimming is used during the manufacturing process of the smart driver chip to either randomly or sequentially assign the fixed address code to the smart driver chip (laser trimming refers to, after the original chip is manufactured, each wafer on the original chip is set with a fixed address using laser, thus each smart driver chip corresponds to a fixed address code). The number of bits of the address code is 2 to the power of 29 (thus able to accommodate 536, 870, 912 address codes that correspond to the smart driver chips).

Each smart driver chip is used for controlling the activation and deactivation of the LED lamp beads in the LED point light source, and to adjust the brightness of the LED lamp beads as well as to regulate whether the status of each LED color lamp bead is normal. The data control signal receiving terminal of the smart driver chip in each set of LED point light sources is connected in parallel to the data control line led out of the decoder controller via connecting wires.

Each LED color lamp bead of each set of LED point light sources is electrically connected in parallel in between the power supply terminal of the power line of the control system and the ground terminal via the smart driver chip.

Each set of the LED point light sources comprises either tri-color lamp beads or quad-color lamp beads, wherein the tri-color has red, green, and blue LED lamp beads, while the quad-color has red, green, blue, and white LED lamp beads.

The smart driver chip is compatible with the return-to-zero code (9823) protocol on the market when working normally; in order to surpass the breakpoint continuation scheme available in the current market, the present invention designs a compatible reset code scheme.

The smart driver chip is driven using a conventional 5V that is able to effectively improve the stability when receiving high signal voltage.

3. The Features of the Control System of the Present Invention

1. In the LED string light source, address lines are used to connect all address pins of the smart driver chip in series based on the natural numerical order of the electrical connection of the decoder controller, wherein for the smart driver chips in each adjacent pair of LED point light sources, the address signal input terminal of the smart driver chips in the preceding set (preceding refers to the set closer to the decoder controller in the electrical connection path, and succeeding refers to the side that is further away from the decoder controller, as follows) is connected to the address signal output terminal of the smart driver chips in the succeeding set, and the address signal output terminal of the smart driver chips in the first set of LED point light sources of the LED string light source is connected to the signal reception terminal of the decoder controller.
2. The smart driver chip of the present invention is provided with an addressing module, and assignment module, and a string light signal transmission module.

1) The addressing module is used for determining the electrical connection distance between the spatial positions of the smart driver chips in each set of LED point light sources in the LED string light source and the decoder controller.

The information sent to the LED string light source via the data control line comprises a clear reset signal, an address status collection signal, and a feedback address receiving signal.

The clear reset signal is for resetting the temporary addresses of the smart driver chips in each set to zero when an electrical power is connected to the LED string light source.

The clear reset signal is preferably a low-level signal of 80 μs.

The address status collection signal is for instructing each smart driver chip to send the chip address and the status information of the smart driver chip back to the decoder controller.

The chip address and status information stored in the shift register of the smart control chip, comprising N1 bits of fixed address information, N2 bits of temporary address information, 2 bits of R color anomaly feedback information, 2 bits of G color anomaly feedback information, and 2 bits of B color anomaly feedback information; or comprising N1 bits of fixed address information, N2 bits of temporary address information, 2 bits of R color anomaly feedback information, 2 bits of G color anomaly feedback information, 2 bits of B color anomaly feedback information, and 2 bits of W color anomaly feedback information.

The address status collection signal is preferably a square wave signal made of a high-level signal ranging 80 μs-1 μs and a low-level signal ranging 80 μs-1 μs. A set of the address status collection signal comprises (N1+N2+2×3) of the square wave signal or a set of the address status collection signal comprising (N1+N2+2×4) of the square wave signal;

The address and the status information of the present invention are preferably data of 48-bit, wherein comprising 29 bits of fixed address information, 11 bits of temporary address information, 2 bits of R color anomaly feedback information, 2 bits of G color anomaly feedback information, and 2 bits of B color anomaly feedback information; or comprising 48 bits of fixed address information, 11 bits of temporary address information, 2 bits of R color anomaly feedback information, 2 bits of G color anomaly feedback information, 2 bits of B color anomaly feedback information, and 2 bits of W color anomaly feedback information, wherein, For the highest digit in each color anomaly feedback information, "0" indicates that there is no leakage of electricity in the color lamp bead, while "1" indicates that there is a leakage of electricity in the color lamp bead;

For the lowest digit in each color anomaly feedback information, "0" indicates that the color lamp bead can light up normally, while "1" indicates an abnormal operation in the color lamp bead.

The feedback address signal, which is the signal received via the address line, is for instructing each smart driver chip to transmit the chip address and the status information back to the decoder controller in sequence based on the electrical connection distance from the smart driver chip to the decoder controller.

The feedback address signal, after each smart driver chip has received one of the address status collection signals, shifts the chip address and the status information stored in the shift register from a low-order digit to a high-order digit by one bit, wherein the highest digit of the chip address and the status information is shifted to the lowest digit position of the shift register of the electrically connected preceding smart driver chip. After each smart driver chip has received one set of the address status collection signals, all the chip address and the status information originally stored in the shift register are transferred to the shift register of the electrically connected preceding smart driver chip; after the first smart driver chip that is electrically connected to the decoder controller has received the first set of the address collection signal, the chip address and the status information will be uploaded to the decoder controller.

In practice, the transmission method of the feedback address signals is as follows:

a. After receiving one address collection signal, each smart driver chip uploads the highest digit of the chip address and the status information stored in the shift register to the position of the lowest digit of the shift register of the electrically connected preceding smart driver chip via the address lines. The other digits of the chip address and the status information are then shifted by one bit higher in the bit count from the lower positions to the higher positions. It should be noted that, after the decoder controller has started to send the first address status collection signal, the chip address and the status information stored in the shift register will undergo changes and then remain in a state of dynamic change. The change will occur once each time the decoder controller sends an address status collection signal.
b. After each smart driver chip has finished receiving one set of the address collection signals, uploads the chip address and the status information stored in the shift register to the shift register of the electrically connected preceding smart driver chip, wherein the number of signals in one set of the address collection signals is equal to the number of bits in the chip address and the status information.

c. After the decoder controller sends out the M-th set of the address collection signals, the chip address and the status information stored in the shift register of the smart driver chip of the M-th LED point light source in the LED string light source will be sequentially uploaded to the decoder controller via the shift registers of the smart driver chips of the (M−1)th, (M−2)th, . . . , 1 st LED point light sources.

After the decoder controller has finished sending the first set of address collection signals, if the smart driver chip of the S-th LED point light source located at the end of the electrical series connection of the LED string light source continues to receive address collection signals, the smart driver chip will upload a binary code of “1” to the smart driver chip of the (S−1)th LED point light source via the address lines, until a stop collection reset signal for halting the address collection sent by the decoder controller via the data control line has been received. In practice, after the S-th smart driver chip has transmitted all the chip address and the status information to the preceding smart driver chip (i.e., the (S−1)-th smart driver chip) and still continues to receive the address collection signals sent by the decoder controller, the S-th smart controller chip will continue to send information of digit “1” to the preceding smart driver chip. When the decoder controller continuously receives the digit “1” equal to the number of digits in the chip address and the status information, this indicates that the chip address and the status information sent by the S-th smart driver chip has been received, and at this moment, the decoder controller naturally assumes that the address collection task has been completed and will issue the aforementioned stop collection reset signal.

The stop collection reset signal is a low-level signal of 80 μs.

2) The assignment module is used for assigning a new temporary address code to the smart driver chip in each set of LED point light sources, wherein the temporary address code is assigned sequentially based on the electrical connection distance between the smart driver chips in the set to the decoder controller.

After the addressing module has finished collecting the chip address and the status information of the smart driver chips in all LED point light sources, the assignment module pairs according to the collected fixed address code of each smart driver chip and the proximity information on the position of each smart driver chip relative to the decoder controller along the electrical connection route. In other words, the temporary address codes assigned to the smart driver chips is based on the distance of the smart driver chips to the electrical connection route of the decoder controller in natural numerical order.

Then, the decoder controller sends both the paired fixed address code and the assigned temporary address code to each smart driver chip via the data control line, thus allowing each smart driver chip to clearly identify the individual positioning along the electrical connection route.

After the decoder controller has sent the stop collection reset signal, sends a special verification code to the LED string light source via the data control line to instruct each smart driver chip to enter a status to readily receive the assigned temporary address codes, wherein the special verification code comprises an instruction code, a checksum code, a current regulation code, an RGBW channel selection code, a circuit detection Boolean code, and a gamma modulation Boolean code, wherein, The instruction code has 16 bits and is 1100111000000111 in the present invention;

The checksum code also has 16 bits and is complementary to the instruction code, thus is 0011000111111000;

The current regulation code has 5 bits and is used to regulate the current level for each LED point light source;

The RGBW channel selection code has 1 bit, wherein the digit “0” indicates the selection of the RGB channel, while the digit “1” indicates the selection of the RGBW channel;

The circuit detection Boolean code has 1 bit, wherein the digit “1” indicates the need for a current regulation, while the digit “0” indicates that the current do not need to be regulated;

The gamma modulation Boolean code has 1 bit, wherein the digit “1” indicates that the gamma modulation is in use, while the digit “0” indicates that the gamma modulation is not in use.

The smart driver chip of the present invention uses a temporary address register of 211, wherein the address number is 2048, the RGB is 65536 brightness levels of the gamma modulation, and the required speed is around 3 kHz.

The method for the decoder controller to send both the fixed address code and the assigned temporary address code of each smart driver chip to the corresponding smart driver chip is as follows:

After each smart driver chip has received the special verification code, the decoder controller sends S sets of temporary write address code signals to the LED string light source, wherein each set of temporary write address code signals corresponds to one smart driver chip of the LED point light source. Each set of temporary address code signals contains 40 bits of information, comprising 29 bits of fixed address code information of the corresponding smart driver chip plus 11 bits of temporary address code information assigned by the decoder controller to the smart driver chip.

Then, after the decoder controller has finished sending S sets of temporary write address codes, the decoder controller sends the reset signal (low-level signal of 80 μs), and each smart driver chip is prompted with the temporary write address operation described above.

3) The string light signal transmission module, after the completion of tasks by both the modules mentioned above, sends the normal working signal mentioned in the “Background of the Present Invention” section of this present application to the LED string light source.

The decoder controller only needs to send the normal working signals according to the natural numerical order when in use. In other words, when the first normal working signal is sent, the first smart driver chip positioned in the electrical connection path will receive the normal working signal, while the other smart driver chips carry out cumulative counting and do not receive the normal working signal; when the n-th normal working signal is sent, the n-th smart driver chip receives the n-th normal working signal when the cumulative counting counts up to n. Other smart driver chips continue to count cumulatively until the decoder controller sends the reset signal (the maximum cumulative count is 2 to the power of 11).

The normal working signal is sent using standard protocol codes of high and low electrical levels, which is high electrical level of 400 ns and low electrical level of 800 ns for “0” code, and high electrical level of 800 ns and low electrical level of 400 ns for “1” code;

The 5-bit current regulation code has a maximum of 48 mA, wherein the 5-bit divides the current equally into 32 segments (i.e., 48 mA is divided into 32 equal segments, with the minimum being 1.5 mA). The default current is 16.5 mA when powered on, thus in other words, the current is 16.5 mA before the current regulation.

The decoder controller sends the write address information to the data control line to write the temporary address into the latch, with the data meaning as follows:

| Public Code (start of each frame) 40 bit (G Code) | | | | | | Private Code (corresponds to each smart drives chip address) 40 bit (S Code) | |
|---|---|---|---|---|---|---|---|
| Instruction Code | Checknum Code | Current Regulation | RGBW | Current detection | Gamma | Fixed Address | Temporary Address |
| 16 bit | 16 bit | 5 bit | 1 bit | 1 bit | 1 bit | 29 bit | 11 bit |

G | S1 | S2 | S..N reset G | S1 | S2 | S..N

4. Additional Features:

The DATA port signal recognition in the present invention can be similar to 9823 (Zero-Code Protocol), which must be referred with the parallel port design method used in the DMX512B3 smart driver chips available in the market.

The constant current accuracy of the smart driver chip is relatively high and should include the capability to correct current levels;

The smart driver chip has reverse polarity protection and is designed for enhancing the quality of the smart driver chip; the smart driver chip can be used with 12V and 24V after adding resistors.

In the series connection of the point light sources, if there is a short circuit between the PO pin and the DI (Data) pin, to solve this issue or to demonstrate the repair to customers, ensure that the driving capability of the PO pin is not designed to be too strong. If too strong, the short circuit between the DI and PO will disrupt the DI signal, and if not strong enough, DI will be driven using 245 (245 is a detail of the chip designed by the applicant), which is relatively stronger, hence the DI signal cannot be disrupted even if a short circuit occurs. At this moment, use a line break check method to determine the PO abnormality. The driving capability should be designed within 1-2 mA (the current is a detail of the chip designed by the applicant).

What is claimed is:

1. A control system for LED string light source, comprising: an LED string light provided with a plurality of LED point light sources, a power line and a data control line connected between a decoder controller and each LED point light source, wherein each set of said LED point light sources comprises either red, green, and blue LED lamp beads with a smart driver chip, or red, green, blue, and white LED lamp beads with said smart driver chip, all said LED lamp beads are connected between a power supply terminal and a ground terminal of said power line through a corresponding smart driver chip, a data reception terminal of each set of said smart driver chips is connected to said data control line via connecting wires, wherein a use of address lines in said LED string light source to connect all address pins of said smart driver chip in series based on a natural numerical order of an electrical connection of said decoder controller, wherein for said smart driver chips in each adjacent pair of LED point light sources, an address signal input terminal of said smart driver chips in a preceding set is connected to an address signal output terminal of said smart driver chips in a succeeding set, and said address signal output terminal of said smart driver chips in first set of said LED point light sources of said LED string light source is connected to a signal reception terminal of said decoder controller, wherein said decoder controller is also provided with an addressing module, an assignment module, and a string light signal transmission module, wherein said addressing module is used for determining an electrical connection distance between spatial positions of said smart driver chips in each set of said LED point light sources in said LED string light source and said decoder controller;

said assignment module is used for assigning a temporary address code to said smart driver chips in each set of said LED point light sources, wherein said temporary address code is assigned sequentially based on said electrical connection distance between said smart driver chips in said set to said decoder controller;

said string light signal transmission module is used for transmitting multimedia information signals to said LED string light source for display, including advertisements, text patterns, and video content, wherein an information which is sent by said addressing module from said data control line to said LED string light source comprises a clear reset signal for resetting said temporary addresses of said smart driver chips in each set to zero when electrical power is connected to said LED string light source, an address status collection signal for instructing each said smart driver chip to send a chip address and a status information of said smart driver chip back to said decoder controller, and a feedback address signal that is received from each said smart driver chip via said address lines for indicating said chip address and said status information that have transmitted back to said decoder controller in sequence based on said electrical connection distance from said smart driver chip to said decoder controller;

said assignment module, after said addressing module has finished collecting said chip addresses and said status information of said smart driver chips in all said LED point light sources, said module assigns said temporary address codes according to numerical order to each said smart driver chip based on said electrical connection distance between said smart driver chip and said decoder controller, and after that, sends both fixed address codes and said assigned temporary address codes of each said smart driver chip via said data control line to each said smart driver chip.

2. The control system for LED string light source recited in claim 1, wherein said chip address and said status information stored in a shift register of said smart control chips, comprising N1 bits of fixed address information, N2 bits of temporary address information, 2 bits of R color anomaly feedback information, 2 bits of G color anomaly feedback information, and 2 bits of B color anomaly feedback information, or comprising N1 bits of fixed address information, N2 bits of temporary address information, 2 bits of R color anomaly feedback information, 2 bits of G color anomaly feedback information, 2 bits of B color anomaly feedback information, and 2 bits of W color anomaly feedback information;

said clear reset signal is a low-level signal of 80 μs;

said address status collection signal is a square wave signal made of a high-level signal ranging 80 μs-1 μs and a low-level signal ranging 80 μs-1 μs, a set of said address status collection signal comprises (N1+N2+2×3) of said square wave signal or a set of said address status collection signal comprising (N1+N2+2×4) of said square wave signal;

said feedback address signal, after each said smart driver chip has received one of said address status collection signals, shifts said chip address and said status information stored in said shift register from a low-order digit to a high-order digit by one bit, wherein a highest digit of said chip address and said status information is shifted to a lowest digit position of said shift register of an electrically connected preceding smart driver chip, after each said smart driver chip has received one set of said address status collection signals, all said chip address and said status information originally stored in said shift register are transferred to said shift register of said electrically connected preceding smart driver chip, and after a first smart driver chip that is electrically connected to said decoder controller has received a first set of address collection signal, said chip address and said status information will be uploaded to said decoder controller.

3. A control method for LED string light source, wherein the control method is as follows:

1) When said fully installed LED string light source is powered on, said decoder controller sends said clear reset signal to said LED string light source via said data control line, thus resetting said temporary address codes of said smart driver chip in each said LED point light source to zero;

2) Then, said decoder controller sends a plurality of said address collection signals to said smart driver chip in each said LED point light source via said data control line, thus instructing each said smart driver chip to start sending said feedback address signals to said decoder controller, and said chip address and said status information stored in said shift registers are transmitted back to said decoder controller;

3) Transmission method of said feedback address signals is as follows:

a. After each said smart driver chip has received one said address collection signal, uploads a highest digit of said chip address and said status information stored in said shift register to a position of a lowest digit of said shift register of said electrically connected preceding smart driver chip via said address lines, and other digits of said chip address and said status information are shifted by one bit higher in bit count from lower positions to higher positions;

b. After each said smart driver chip has finished receiving one set of said address collection signals, uploads said chip address and said status information stored in said shift register to said shift register of said electrically connected preceding smart driver chip, wherein a number of signals in one set of said address collection signals is equal to a number of bits in said chip address and said status information;

c. After said decoder controller sends out an M-th set of said address collection signals, said chip address and said status information stored in said shift register of said smart driver chip of an M-th LED point light source in said LED string light source will be sequentially uploaded to said decoder controller via said shift register of said smart driver chip of an (M−1)-th, (M−2)-th, . . . , 1st LED point light source;

4) After said decoder controller has finished collecting said chip addresses and said status information of said smart driver chips in all said LED point light sources, assign said temporary address code to each said smart driver chip in numerical order according to said electrical connection distance between said smart driver chips to said decoder controller;

5) Then, said decoder controller sends both said fixed address code and said assigned temporary address code to said corresponding smart driver chip via said data control line.

4. The control method for LED string light source recited in claim 3, wherein said address and said status information are a data of 48-bit, wherein comprising 29 bits of fixed address information, 11 bits of temporary address information, 2 bits of R color anomaly feedback information, 2 bits of G color anomaly feedback information, and 2 bits of B color anomaly feedback information; or comprising 48 bits of fixed address information, 11 bits of temporary address information, 2 bits of R color anomaly feedback information, 2 bits of G color anomaly feedback information, 2 bits of B color anomaly feedback information, and 2 bits of W color anomaly feedback information, wherein for a highest digit in each color anomaly feedback information, "0" indicates that there is no leakage of electricity in said color lamp bead, while "1" indicates that there is leakage of electricity in said color lamp bead;

for a lowest digit in each color anomaly feedback information, "0" indicates that said color lamp bead can light up normally, while "1" indicates an abnormal operation said color lamp bead.

5. The control method for LED string light source recited in claim 4, wherein after said decoder controller has finished sending first set of said address collection signals, if said smart driver chip of an S-th LED point light source located at an end of electrical series connection of said LED string light source continues to receive said address collection signals, said smart driver chip will upload a binary code of "1" to said smart driver chip of an (S−1)-th LED point light source via said address lines, until a stop collection reset signal for halting address collection sent by said decoder controller via said data control line has been received.

6. The control method for LED string light source recited in claim 5, wherein said stop collection reset signal is a low-level signal of 80 μs.

7. The control method for LED string light source recited in claim 6, wherein after said decoder controller has sent said stop collection reset signal, sends a special verification code to said LED string light source via said data control line to instruct each said smart driver chip to enter a status to readily receive said assigned temporary address codes, wherein said special verification code comprises an instruction code, a checksum code, a current regulation code, an RGBW channel selection code, a circuit detection Boolean code, and a gamma modulation Boolean code, wherein said instruction code has 16 bits;

said checksum code also has 16 bits and is complementary to said instruction code;

said current regulation code has 5 bits and is used to regulate a current level for each said LED point light source;

said RGBW channel selection code has 1 bit, wherein digit “0” indicates a selection of RGB channel, digit “0” indicates a selection of RGBW channel;

said circuit detection Boolean code has 1 bit, wherein digit “1” indicates a need for a current regulation, digit “0” indicates that current do not need to be regulated;

said gamma modulation Boolean code has 1 bit, wherein digit “1” indicates that a gamma modulation is in use, digit “0” indicates that said gamma regulation is not in use.

8. The control method for LED string light source recited in claim 7, wherein said decoder controller sends both said fixed address code and said assigned temporary address code of each said smart driver chip to said corresponding smart driver chip as follows:

after each said smart driver chip has received said special verification code, said decoder controller sends S sets of temporary write address code signals to said LED string light source, wherein each set of said temporary write address code signals corresponds to one said smart driver chip of said LED point light source, each set of said temporary write address code signals contains 40 bits of information, comprising 29 bits of fixed address code information of said corresponding smart driver chip plus 11 bits of temporary address code information assigned by said decoder controller to said smart driver chip.

* * * * *